United States Patent [19]
Gonzalez et al.

[11] Patent Number: 5,309,995
[45] Date of Patent: May 10, 1994

[54] WELL TREATMENT USING BALL SEALERS

[75] Inventors: Manuel E. Gonzalez, Kingwood; James R. Bailey, Houston; Walter J. Lamb, The Woodlands, all of Tex.

[73] Assignee: Exxon Production Research Company, Houston, Tex.

[21] Appl. No.: 33,993

[22] Filed: Mar. 19, 1993

Related U.S. Application Data

[63] Continuation-in-part of Ser. No. 664,711, Mar. 5, 1991, abandoned.

[51] Int. Cl.⁵ .................................. E21B 33/138
[52] U.S. Cl. .................................. 166/284
[58] Field of Search ............... 166/281, 284, 292, 295; 428/403, 407

[56] References Cited

U.S. PATENT DOCUMENTS

| 4,139,060 | 2/1979 | Muecke et al. | 166/281 |
| 4,139,060 | 2/1979 | Mueeke et al. | 166/284 X |
| 4,194,561 | 3/1980 | Stokley et al. | 166/284 |
| 4,407,368 | 10/1983 | Erbstoesser | 166/284 |
| 4,505,334 | 3/1985 | Doner et al. | 166/284 |
| 4,702,318 | 10/1987 | Chung et al. | 166/284 X |
| 4,753,295 | 6/1988 | Gabriel et al. | 166/284 |

OTHER PUBLICATIONS

Greene, Tweed Engineered Plastics Brochure.

*Primary Examiner*—Ramon S. Britts
*Assistant Examiner*—Frank S. Tsay

[57] ABSTRACT

Ball sealers comprising a polyetheretherketone are introduced into a well to seal well perforations and divert fluid therein. In the preferred embodiment the ball sealers have a density less than the treating fluid.

9 Claims, 1 Drawing Sheet

5,309,995

WELL TREATMENT USING BALL SEALERS

This application is a continuation-in-part application of co-pending application Ser. No. 07/664,711, filed on Mar. 5, 1991.

FIELD OF THE INVENTION

In one aspect, the invention relates to a method of diverting treating fluids during the treatment of wells. In another aspect, the invention relates to sealers which can be used for sealing well perforations. In yet another aspect, the invention relates to the use of sealers in the treatment of wells.

BACKGROUND OF THE INVENTION

It is common practice in completing oil and gas wells to set a string of pipe, known as casing, in the well and use cement around the outside of the casing to isolate the various formations penetrated by the well. To establish fluid communication between the hydrocarbon-bearing formations and the interior of the casing, the casing and cement sheath are perforated.

At various times during the life of the well, it may be desirable to increase the production rate of hydrocarbons by using appropriate treating fluids such as acids, solvents or surfactants. If only a short, single pay zone in the well has been perforated, the treating fluid will flow into the pay zone where it is required. As the length of the perforated pay zone or the number of perforated pay zones increases, the placement of the fluid treatment in the regions of the pay zones where it is required becomes more difficult. For instance, the strata having the highest permeability will most likely consume the major portion of a given stimulation treatment leaving the least permeable strata virtually untreated. Therefore, techniques have been developed to divert the treating fluid from its path of least resistance so that the low permeability zones are also treated.

One technique for achieving diversion involves the use of downhole equipment such as packers. Although these devices are effective, they are quite expensive due to the involvement of associated workover equipment required during the tubing-packer manipulations. Additionally, mechanical reliability tends to decrease as the depth of the well increases.

As a result, considerable effort has been devoted to the development of alternative diverting methods. One widely used diverting technique uses small rubber-coated balls, known as ball sealers, to seal off casing perforations.

These ball sealers are pumped into the wellbore along with the formation treating fluid. The balls are carried down the wellbore and onto the perforations by the flow of the fluid through the perforations into the formation. The balls seat upon the perforations and are held there by the pressure differential across the perforations.

Major advantages of utilizing ball sealers as a diverting agent include ease of use, positive shutoff, no involvement with the formation, and low risk of incurring damage to the well. The ball sealers are injected at the surface and transported by the treating fluid. Other than a ball injector, no special or additional treating equipment is required. The ball sealers are designed to have an outer covering sufficiently compliant to seal a jet formed perforation and to have a solid, rigid core which resists extrusion into or through the perforation. Therefore, the ball sealers will not penetrate the formation and permanently damage the flow characteristics of the well.

Several requirements are repeatedly applied to ball sealers as they are normally utilized today. First the ball sealers must be chemically inert in the environment to which they are exposed. Second, they must seal effectively, yet not extrude into the perforations. Third, the ball sealers must release from the perforations when the pressure differential into the formation is relieved.

To meet these requirements, various materials for ball sealers have been suggested including rubber, nylon, plastic, aluminum, rubber-coated aluminum, rubber-covered phenolic, rubber-covered nylon, and even permeable plastic consolidated walnut hull balls. One difficulty with ball sealers composed of such materials is that the balls which are currently available often do not exhibit sufficient resistance to chemical attack by treating fluids. Another difficulty is that materials having a temperature resistance suitable for high temperature applications have a high density as compared to common treating fluids. In the case of rubber coated balls, the perforation can actually cut the rubber covering in the area of the pressure seal. Once the ball sealer loses its structural integrity the unattached rubber is free to lodge permanently in the perforation which can reduce the flow capacity of the perforation and may permanently damage the well. Excessive heat, such as is present in deep wells can also cause such ball sealers to lose structural integrity. Deeper drilling has demanded stimulation jobs that are conducted under conditions that exceed the current temperature and pressure limitations of available low density ball sealers. Available low density ball sealers are not suitable for temperatures over 350° F. (177° C.) or pressures over 8,000 psi (562.5 kg/cm$^2$).

A need exists for improved low density ball sealers which function well in such hot, hostile environments, especially in the presence of acidic fluids.

SUMMARY OF THE INVENTION

One embodiment of the present invention overcomes the limitations of ball sealers used in the prior art by providing a ball sealer comprising a polyetheretherketone polymer (PEEK). Such ball sealers resist chemical degradation by treating fluids while effectively sealing perforations in the casing and resisting extrusion through the perforations. Such ball sealers have no outer coating which can be cut or separated from the core. When used at high temperatures and adequate differential pressures, ball sealers formed from PEEK deform sufficiently to notably reduce flow across or even seal against the perforations. The ball sealers can be used in an otherwise conventional method for diverting fluids in the treatment of subterranean formations with the balls being sized so as to significantly restrict flow or seal the perforations.

In another embodiment, the present invention provides an improved method for diverting fluids in the treatment of subterranean formations. The method preferably involves the use of the above-described ball sealer, but can be carried with other types of ball sealers provided that the density of the ball sealers is less than that of the treating liquid but greater than that of a selected follower fluid. The method is carried out by flowing down the well a plurality of the ball sealers until the ball sealers engage and seal perforations within the well. The treating fluid is then diverted to the unsealed portions providing an effective means for injecting treating fluids through desired well perforations. PEEK is particularly suited for use as sealer balls in high temperature applications because its relatively low density provides buoyancy as compared to other materials which are stable at high temperatures. By then introducing a follower fluid having a density less than that of the selected ball sealers into the casing and then releasing the differential pressure, the ball sealers will release and settle to the bottom of the casing where they do not interfere with production from the well.

DESCRIPTION OF THE PREFERRED EMBODIMENT

Figure 1:
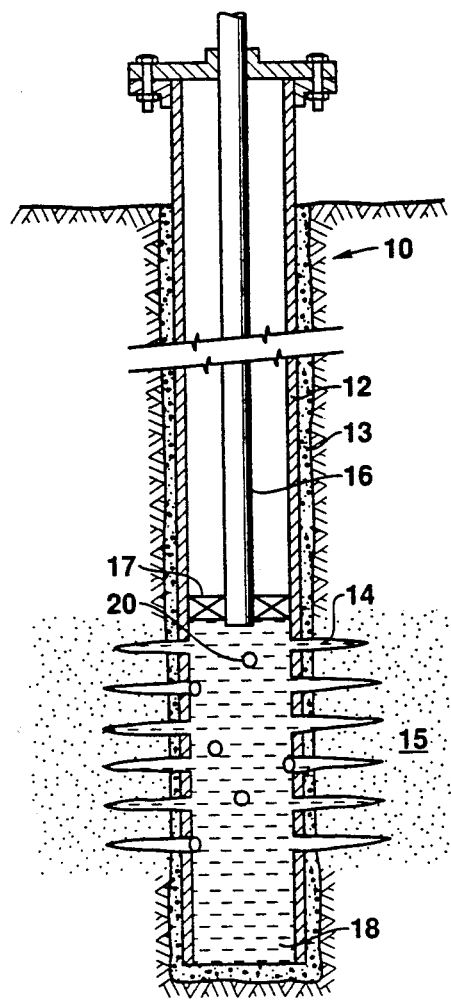
FIG. 1 is an elevation view in section of a well illustrating the practice of the present invention.

Utilization of the present invention according to a preferred embodiment is depicted in FIG. 1. The well 10 of FIG. 1 has a casing 12 extending for at least a portion of its length and is cemented around the outside to hold casing 12 in place and isolate the penetrated formations or intervals. Preferably the casing runs the full length of the well. The cement sheath 13 extends upward from the bottom of the wellbore in the annulus between the outside of the casing and the inside wall of the wellbore at least to a point above producing strata 15. For the hydrocarbons in the producing strata 15 to be produced, it is necessary to establish fluid communication between the producing strata 15 and the interior of the casing 12. This is accomplished by perforations 14 made through the casing 12 and the cement sheath 13 by means known to those of ordinary skill. The perforations form a flow path for fluid from the formation into the casing and vice versa.

The hydrocarbons flowing out of the producing strata 15 through the perforations 14 and into the interior of the casing 12 may be transported to the surface through a production tubing 16. A production packer 17 can be installed near the lower end of the production tubing 16 and above the highest perforation to achieve a pressure seal between the producing tubing 16 and the casing 12. Production tubings are not always used and, in those cases, the entire interior volume of the casing is used to conduct the hydrocarbons to the surface of the earth.

When diversion is needed during a well treatment, ball sealers 20 are used to close off some of the perforations. These ball sealers are preferred to be approximately spherical in shape, but other geometries may be used.

Using ball sealers 20 to plug some of the perforations 14 is accomplished by introducing the ball sealers 20 into the casing 12 at a predetermined time during the treatment.

When the ball sealers 20 are introduced into the fluid upstream of the perforated parts of the casing, they are carried down the production tubing 16 or casing 12 by the fluid flow. Once the fluid arrives at the perforated interval in the casing, it flows outwardly through the perforations 14 and into the strata 15 being treated. The flow of the treating fluid through the perforations 14 carries the ball sealers 20 toward the perforations 14 causing them to seat on the perforations 14. Once seated on the perforations, ball sealers 20 are held onto the perforations by the fluid pressure differential which exists between the inside of the casing and the producing strata 15 on the outside of the casing. The ball sealers are preferably sized to seal the perforations, when seated thereon. The seated ball sealer serves to effectively close those perforations 14 until such time as the pressure differential is reversed, and the ball sealers are released.

The ball sealers 20 will tend to first seal the perforations through which the treating fluid is flowing most rapidly. The preferential closing of the high flowrate perforations tends to equalize treatment of the producing strata over the entire perforated interval.

For maximum effectiveness in seating on perforations the ball sealers preferably should have a density less than the density of the treating fluid in the wellbore at the temperature and pressure conditions encountered in the perforated area downhole. If a ball sealer is not sufficiently strong to withstand these pressures, it will collapse, causing the density of the ball sealer to increase to a density which can easily exceed the fluid density. Under such conditions, performance will decline. Certain embodiments of the invention are highly suitable for use in in deep wells where bottom hole pressure during stimulation will generally be in the range of 5,000-25,000 psi (351-1758 kg/cm$^2$), usually in the range of 8,000-20,000 psi (562-1406 kg/cm$^2$. Wells having downhole pressures in the range of 10,000-20,000 psi (703-1406 kg/cm$^2$) are highly amenable to treatment according to certain embodiments of present invention.

Figure 2:
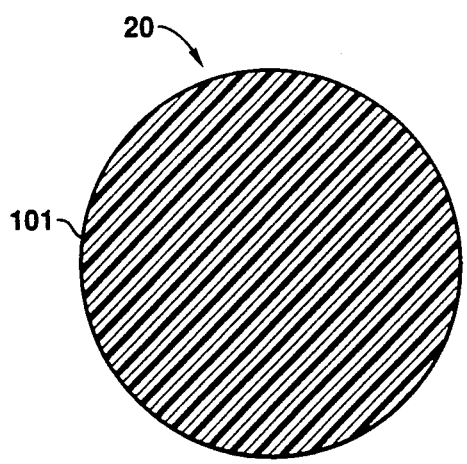
FIG. 2 is a view of a ball sealer in section.

Since fluids used for treating wells generally have densities ranging from approximately 0.7 grams per cubic centimeter (g/cc) to 1.5 g/cc or above, usually in the range of 0.9-1.4 g/cc, and, for acidic fluids, preferably in the range of 1.1-1.4 g/cc, one advantage of utilizing a PEEK ball sealer is that density can be easily varied over a large part of this range. One such ball sealer capable of withstanding typical bottomhole treating pressures yet maintaining a density preferably in the 0.9 to 1.4 g/cc range is depicted in FIG. 2. This spherical ball sealer 20 has a spherical core 101 made of PEEK. Air or other gas may be injected into the sealers during the molding process to reduce density if desired or hollow glass microspheres may be used. Glass fibers can be added to increase specific density. Graphite and/or carbon fibers can be added to decrease density and increase strength. Mixtures of graphite and glass are most preferred to "fine tune" the density of the balls to within the range of 1.1 to 1.4 g/cc. By adjusting the density of the sealers so that they are less dense than the treating fluid but more dense than a selected follower fluid, the sealers can be caused to sink to the bottom of the casing by filling the casing with the follower fluid prior to releasing the differential pressure thereby disengaging the sealers from the perforations. The sealers may be formed using standard injection molding techniques. The actual molding conditions will vary with differing PEEK formulations and can be determined by those ordinarily skilled in the art.

Tests carried out on the PEEK ball sealers have shown that they are mechanically stable when subjected to a 25,000 psi 1758 kg/cm$^2$ hydrostatic pressure. Peek ball sealers (⅞ inch, 2.22 cm) have also been successfully tested at 5,000 psi (352 kg/cm$^2$) differential pressures across simulated perforations (0.32 inch, 0.81 cm) at temperatures on the order of 430° F. (211° C.).

More specifically, as set forth in Example III, laboratory and field tests carried out on aerated, carbon-filled, PEEK ball sealers with densities in the range of 0.9-1.09 g/cc have shown that the ball sealers undergo some deformation, but remain intact, when subjected to a 20,000 psi (1406 kg/cm$^2$) hydrostatic pressure. Aerated, carbon-filled PEEK ball sealers ($\frac{7}{8}$ inch, 2.22 cm) have also been successfully tested at 6,000 psi (422 kg/cm$^2$) differential pressures across simulated perforations (0.375 inch, 0.952 cm) at temperatures on the order of 450° F. (211° C.).

High temperature resistance is one important benefit provided by the PEEK ball sealers of the invention. Low density ball sealers of the prior art were generally not suitable for use at over 300° F. The inventive ball sealers provide good results over a temperature range of 350° F.-450° F. (177° C.-272° C.). In the 450° F. to 600° F. range (232° C.-315° C.) the invention is believed to provide highly superior results to other polymeric materials.

To summarize, the inventive ball sealers of the present invention perform successfully in hostile well environments, specifically acidic conditions at temperatures up to 450° F. (232° C.) and at pressures up to 20,000 psi (138 MPa). The inventive ball sealers are based on aerating a temperature resistant thermoplastic called Polyetheretherketone, or PEEK, that is reinforced with carbon fibers. For a ball sealer to perform properly during a workover operation in a hostile well environment (for example, acid fracturing a 20,000 ft deep well using 20% HCL), the ball sealer material must withstand temperatures exceeding 300° F. (149° C.) at effective downhole hydrostatic pressures of 15,000 psi (104 MPa) or higher. Furthermore, most applications require ball sealers with densities ranging from 0.90 to 1.10 gm/cc. Though physical and chemical properties of carbon-fiber reinforced PEEK make it ideal for hostile environment applications, the 1.39 g/cc density of the material is too high for typical workover operations requiring ball sealers. Accordingly, in a preferred embodiment of the present invention, air can be injected into the PEEK material while moulding the balls to decrease ball density. As set forth in the examples below, a series of laboratory and field tests were performed to ensure that aerated, carbon-fiber reinforced PEEK would perform satisfactorily as a ball sealer under hostile environments.

EXAMPLE I

Testing of a glass-filled PEEK ball sealer was requested to determine if it would retain its form under high temperature and pressure. These ball sealers were tan in color with a solid core.

Each of the four ball sealers received were placed into a 4 oz. jar containing 100 mls of 28% HCl acid. The jars were placed in a high temperature and pressure autoclave which uses mineral oil for a heat transfer media. The autoclave was heated to 400° F. and pressured up to 10,000 psi. The temperature and pressure were maintained for four hours. The autoclave was then cooled and the jars removed. The ball sealers were removed and rinsed well.

A beginning weight had been recorded for each ball sealer before testing. After removing the ball sealers from the test environment, they were reweighed. There was a fractional increase in weight for each of the ball sealers tested.

| Ball # | Beginning Wt. | Ending Wt. | Weight Gained |
| --- | --- | --- | --- |
| 1 | 8.6448 gms | 8.7170 gms | 0.0722 gms |
| 2 | 8.7422 gms | 8.7950 gms | 0.0528 gms |
| 3 | 8.7617 gms | 8.8446 gms | 0.0829 gms |
| 4 | 8.6937 gms | 8.7680 gms | 0.0743 gms |

Each of the ball sealers retained their form. They appear to have the original hardness as their pretesting condition. Except for discoloration no outward visual change was observed. The weight increase for the glass-filled balls is much less than for the aerated balls.

EXAMPLE II

Hostile Environment Ball Sealers (HEBS)

No ball sealers available in the market passed the acid stimulation test conditions (high temperature/pressure) expected on the test well. We used several new materials to create ball sealers that successfully passed the expected conditions, over 350° F., and 10,000 psi. The ball sealers selected from these tests were successful in diverting the acid frac, and yielded an increase in rate from the expected 20 MCFG/D to an estimated 35 MCFG/D. This provided a potential increase in revenues of $8,000K/year in a competitive reservoir (a production increase from 20 YICF/D to 35 MCF/D).

The technology is based on a temperature resistant thermoplastic called Polyetheretherketone (PEEK). PEEK is also used for downhole tubing to packer seals. The physical and mechanical properties of the material (a minimum hydraulic compressive strength of 20k psi and a service temperature of over 600° F.) makes it ideal for a hostile environment application. Available ball sealers are limited to 300° F., and 8,000 psi hydraulic compressive strength.

To meet the needs of an acid fracture scheduled for the target formation at 24,600' and a possible acid fracture for an even deeper formation required ball sealer material that could withstand 430° F. and an effective stimulation downhole hydrostatic pressure of 15,000 psi. The test exposed the balls to 15% HCL, at 400° F., with 10,000 psi of hydrostatic pressure. Only the HEBS passed this initial test. The HEBS employed contained carbon fiber and had been aerated to reduce density. In addition, the HEBS were tested with 5,000 psi differential pressure against a perforation at 400° F. for 4 hours and it exhibited no leaks. The HEBS were also tested to a hydrostatic pressure of 25,000 psig (at 400° F.) with no change in shape or performance.

After pumping a successful acid fracture treatment of 100,000 gallons and observing very effective pressure response from the ball action, the test well tested at 24.5 MCFG/D at a flowing tubing pressure (FTP) of 4,500 psig. At the field's normal 3,000 psig FTP, the test well is capable of producing about 35 MCFG/D. The previously used acid stimulation design exhibited no ball action on two offset wells in the same reservoir.

EXAMPLE III

Laboratory Testing

As shown in Table 1 below, a total of 158 aerated, carbon-fiber reinforced PEEK balls underwent a series of tests to measure their resistance to deformation, to density change, and to extrusion under high temperatures and pressures. Densities ranged from less that 1.0 gm/cc to 1.09 gm/cc. Balls in groups of five underwent four series of hydrostatic tests at different temperatures, pressures, and times. After each of the four series of hydrostatic tests, the balls remained solid and, through experiencing some diametric deformation, maintained sufficient curvature to effectively reduce or seal fluid flow across a perforation. Following the hydrostatic tests, six balls representing different densities underwent extrusion testing. These six balls were subjected to 6,000 psi (42 MPa) differential pressures across a 0.375 inch (9.52 mm) hole representing a simulated perforation for one hour at 72° F. (22° C.). None of these six balls extruded through the simulated perforation.

An additional 27 balls (or 32 balls total) underwent 15,000 psi (104 MPa) pressures for 17 hours at 350° F. (177° C.). As shown in Table 2 below, these balls were divided into five groups based on density. Ball densities and dimensions were measured before and after the test. Results show the average change in ball density (using fluid standards) was 27%, while the average change in the ratio of ball diameters was 14%. Though deformations occurred, each ball was able to maintained sufficient curvature to effectively reduce or seal fluid flow across a perforation. Though changes in ball densities can affect ball/fluid density contrasts which, in turn, can affect sealing efficiency during a job, these effects are minimized to some extent due to the compressibility of the worker fluid. Furthermore, by accounting for possible changes in ball densities for a particular application, workover fluid densities may vary by design in a manner that maintains the proper ball/fluid density contrast, thus ensuring sufficient sealing efficiency.

Aerated, carbon-fiber reinforced PEEK balls also remained intact following exposure to 15% HCL at 400° F. (204° C.) under 10,000 psi (69 MPa) hydrostatic pressure. Furthermore, while deformations occurred, the balls were able to seal completely across a simulated perforation when subject to a 5,000 psi (35 MPa) pressure differential.

TABLE 1

| ARLON 1260 Carbon-filled PEEK | | Laboratory Tests (2/93) | | | | Extrusion | Field Test (3/4/93) BHT: 250° F. |
|---|---|---|---|---|---|---|---|
| | | Hydrostatic | | | | | 16 ksi Hydrostatic |
| Density (gm/cc) | Number of Balls | 72° F. 12 ksi 2 hr | 350° F. 15 ksi 17 hr | 375° F. 15 ksi 24 hr | 450° F. 15 ksi 24 hr | 72° F. 6 ksi <1 hr | 4 ksi Differential 2 hr |
| <1.00 | 6 | 5 | | | | 1 | |
| 1.01 | 0 | | | | | | |
| 1.02 | 0 | | | | | | |
| 1.03 | 38 | | 5 | | | 1 | 32 |
| 1.04 | 0 | | | | | | |
| 1.05 | 45 | | 11 | 5 | | 1 | 28 |
| 1.06 | 0 | | | | | | |
| 1.07 | 47 | | 11 | | 5 | 1 | 30 |
| 1.08 | 18 | | 4 | | | 1 | 13 |
| 1.09 | 4 | | 1 | | | 1 | 2 |
| 1.10 | 0 | | | | | | |
| Total: | 158 | = 5 | + 32 | + 5 | + 5 | + 6 | + 105 |

Reference TABLE 2

TABLE 2

| | Laboratory Test: 350° F., 15 ksi hydrostatic, 17 hr | | | | | | | | | |
|---|---|---|---|---|---|---|---|---|---|---|
| | Ball Density (gm/cc) | | | Ball Size (cm) | | | | | | |
| Ball Number | Before Test | After Test | Percent Change | Before Test | | | After Test | | | Percent Change |
| | | | | Min. Dia. | Max. Dia. | Ratio | Min. Dia. | Max. Dia. | Ratio | |
| 1 | 1.03 | 1.34 | 30 | 2.29 | 2.36 | 1.03 | 2.12 | 2.36 | 1.12 | 9 |
| 2 | 1.03 | 1.35 | 31 | 2.30 | 2.36 | 1.03 | 2.11 | 2.36 | 1.12 | 9 |
| 3 | 1.03 | 1.35 | 31 | 2.29 | 2.36 | 1.03 | 1.68 | 2.35 | 1.40 | 36 |
| 4 | 1.03 | 1.34 | 30 | 2.29 | 2.36 | 1.03 | 2.07 | 2.35 | 1.14 | 11 |
| 5 | 1.03 | 1.34 | 30 | 2.29 | 2.36 | 1.03 | 2.19 | 2.33 | 1.07 | 4 |
| 6 | 1.05 | 1.34 | 28 | 2.30 | 2.36 | 1.03 | 1.74 | 2.35 | 1.35 | 31 |
| 7 | 1.05 | 1.35 | 29 | 2.30 | 2.36 | 1.03 | 2.10 | 2.32 | 1.10 | 8 |
| 8 | 1.05 | 1.34 | 28 | 2.27 | 2.35 | 1.03 | 2.26 | 2.35 | 1.04 | 0 |
| 9 | 1.05 | 1.35 | 29 | 2.27 | 2.36 | 1.04 | 2.24 | 2.33 | 1.04 | 0 |
| 10 | 1.05 | 1.35 | 29 | 2.29 | 2.36 | 1.03 | 2.13 | 2.34 | 1.10 | 7 |
| 11 | 1.05 | 1.34 | 28 | 2.29 | 2.36 | 1.03 | 1.66 | 2.32 | 1.40 | 36 |
| 12 | 1.05 | 1.34 | 28 | 2.29 | 2.36 | 1.03 | 2.02 | 2.36 | 1.16 | 13 |
| 13 | 1.05 | 1.34 | 28 | 2.29 | 2.36 | 1.03 | 1.87 | 2.34 | 1.25 | 22 |
| 14 | 1.05 | 1.34 | 28 | 2.29 | 2.36 | 1.03 | 1.92 | 2.34 | 1.22 | 18 |
| 15 | 1.05 | 1.35 | 29 | 2.29 | 2.34 | 1.02 | 2.01 | 2.35 | 1.17 | 14 |
| 16 | 1.05 | 1.34 | 28 | 2.29 | 2.36 | 1.03 | 2.15 | 2.36 | 1.10 | 7 |
| 17 | 1.07 | 1.34 | 25 | 2.29 | 2.36 | 1.03 | 1.94 | 2.34 | 1.21 | 17 |
| 18 | 1.07 | 1.35 | 26 | 2.29 | 2.36 | 1.03 | 1.93 | 2.34 | 1.22 | 18 |
| 19 | 1.07 | 1.35 | 26 | 2.29 | 2.36 | 1.03 | 2.09 | 2.35 | 1.12 | 9 |
| 20 | 1.07 | 1.34 | 25 | 2.27 | 2.35 | 1.03 | 2.18 | 2.36 | 1.08 | 5 |
| 21 | 1.07 | 1.35 | 26 | 2.28 | 2.35 | 1.03 | 1.96 | 2.35 | 1.20 | 17 |
| 22 | 1.07 | 1.35 | 26 | 2.29 | 2.36 | 1.03 | 2.00 | 2.34 | 1.17 | 14 |
| 23 | 1.07 | 1.35 | 26 | 2.29 | 2.36 | 1.03 | 1.71 | 2.36 | 1.37 | 34 |
| 24 | 1.07 | 1.35 | 26 | 2.29 | 2.36 | 1.03 | 1.80 | 2.36 | 1.31 | 28 |
| 25 | 1.07 | 1.34 | 25 | 2.28 | 2.35 | 1.03 | 2.25 | 2.34 | 1.04 | 1 |
| 26 | 1.07 | 1.34 | 25 | 2.27 | 2.35 | 1.03 | 2.11 | 2.35 | 1.11 | 8 |
| 27 | 1.07 | 1.34 | 25 | 2.29 | 2.36 | 1.03 | 1.78 | 2.36 | 1.32 | 29 |
| 28 | 1.08 | 1.34 | 24 | 2.29 | 2.36 | 1.03 | 2.08 | 2.35 | 1.13 | 10 |
| 29 | 1.08 | 1.35 | 25 | 2.29 | 2.36 | 1.03 | 2.08 | 2.35 | 1.13 | 10 |
| 30 | 1.08 | 1.34 | 24 | 2.29 | 2.36 | 1.03 | 1.84 | 2.34 | 1.27 | 24 |

TABLE 2-continued

| | Ball Density (gm/cc) | | | Ball Size (cm) | | | | | | |
|---|---|---|---|---|---|---|---|---|---|---|
| | | | | Before Test | | | After Test | | | |
| Ball | Before | After | Percent | | | | | | | Percent |
| Number | Test | Test | Change | Min. Dia. | Max. Dia. | Ratio | Min. Dia. | Max. Dia. | Ratio | Change |
| 31 | 1.08 | 1.35 | 25 | 2.28 | 2.36 | 1.03 | 2.26 | 2.35 | 1.04 | 1 |
| 32 | 1.09 | 1.35 | 24 | 2.29 | 2.36 | 1.03 | 2.10 | 2.35 | 1.12 | 9 |
| | | Average: | 27 | | | | | | Average: | 14 |
| | | Maximum: | 31 | | | | | | Maximum: | 36 |

Field Testing

Several field tests of aerated, carbon-fiber reinforced PEEK balls also have occurred. The first field test was reported in Example II.

The second field test involved pumping 2,976 bbl (473 kl) of 15% HCL acid as part of an acid fracturing job for a hostile environment well located in Oklahoma. The well depth was about 24,500 ft (2,438 m) with 124, 0.300-in. (7.62 mm) diameter perforations located near the bottom of the well. A total of 107, ⅞-in. (2.22 cm) diameter, 1.06 gm/cc density, aerated, carbon-filled PEEK balls were pumped in four stages of 25 balls during the workover operation. Bottomhole temperatures reached 385° F. (196° C.) with hydrostatic pressures approaching 20,000 psi. Operators reported good ball action during intermediate stages of the job as indicated by notable increases in pump pressures. About 181 bbl (28.7 kl) of water was flushed to the bottom of the well so the balls would separate and fall to the bottom once production resumed. Thus, no balls were recovered. Operators were satisfied, however, that the balls had performed as planned.

A third field test recently involved pumping HCL acid into a 14,000 ft (4267 m) deep well in West Texas. The acid was pumped in three, 80 bbl (12.7 kl) stages, with HCL concentrations of 8, 16, and 20%, respectively. Thirty barrels (4.74 kl) of water preceded the first stage, followed by 80 bbl (12.7 kl) after the third stage. As shown in Table 1, 105 aerated, carbon-fiber reinforced PEEK balls with densities ranging from 1.03 to 1.09 gm/cc were pumped down the well to block a majority of the 121 perforations located near the bottom. Estimated hydrostatic pressure at the perforations was about 16,000 psi (111 MPa), with bottomhole temperatures of about 250° F. (121° C.). The estimated differential pressure across the perforations was about 4,000 psi (27.7 MPa). Ball action was observed during the job as indicated by notable increases in pump pressures at periodic intervals during the course of the treatment. Based on information from treatment reports and on-field observations, operators were satisfied that the balls had performed as planned.

We claim:

1. A method of treating a subterranean formation surrounding a cased wellbore wherein the casing has an interval provided with a plurality of perforations, said interval being in a hostile environment, including a temperature in the range of 177°-316° C. and a pressure in the range of 350-1758 kg/cm², said method comprising:

(a) flowing down said casing to said perforated interval a plurality of ball sealers suspended in a liquid medium, said ball sealers having a density less than the density of said liquid and being sized to significantly seal said perforations, said ball sealers comprised of a carbon-fiber reinforced polyetheretherketone polymer and having been aerated to reduce said density of said ball sealer to a density in the range of 1.1 g/cc-1.3 g/cc; and (b) continuing the flow of said liquid until said ball sealers seal at least a portion of said perforations.

2. The method as defined in claim 1 wherein the temperature is in the range of 204° C. to 315° C.

3. The method as defined in claim 1 wherein said plurality of ball sealers each has a temperature of at least 316° C. and remain intact at pressures up to at least 1758 kg/cm².

4. The method as defined in claim 1 wherein said liquid medium comprises a mineral acid.

5. The method as defined in claim 1 wherein said plurality of ball sealers further contain glass fibers.

6. A method of treating a subterranean formation surrounding a cased wellbore wherein the casing has an interval provided with a plurality of perforations, said interval being in a hostile environment, including a temperature in the range of 177°-316° C. and a pressure in the range of 350-1758 kg/cm², said method comprising:

(a) flowing down said casing to said perforated interval a plurality of ball sealers suspended in a liquid medium, said ball sealers having a density less than the density of said liquid and being sized to significantly seal said perforations, said ball sealers comprised of carbon-fiber reinforced polyetheretherketone and having been aerated to reduce said density of said ball sealer to a density in the range of 0.9 g/cc-1.1 g/cc; and (b) continuing the flow of said liquid until said ball sealers significantly seal at least a portion of said perforations.

7. The method as defined in claim 6 wherein the temperature is in the range of 177° C. to 232° C.

8. The method as defined in claim 6 wherein said plurality of ball sealers further contain glass fibers.

9. The method as defined in claim 6 further comprising the steps of:

(c) treating the formation;

(d) then filling said casing below said perforated interval with a follower fluid having a density less than the density of the plurality of ball sealers; thereby causing the ball sealers to release from the perforations.

* * * * *